United States Patent
Nakazawa et al.

(10) Patent No.: US 7,553,399 B2
(45) Date of Patent: Jun. 30, 2009

(54) HYDROGEN PRODUCTION APPARATUS WITH ELECTROLYTE OF VARYING THICKNESSES

(75) Inventors: Koji Nakazawa, Wako (JP); Masanori Okabe, Wako (JP); Kenji Taruya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 461 days.

(21) Appl. No.: 11/411,750

(22) Filed: Apr. 26, 2006

(65) Prior Publication Data

US 2006/0237306 A1 Oct. 26, 2006

(30) Foreign Application Priority Data

Apr. 26, 2005 (JP) ............................. 2005-127371
Feb. 14, 2006 (JP) ............................. 2006-037145

(51) Int. Cl.
C25B 9/00 (2006.01)

(52) U.S. Cl. ...................................... 204/258; 204/252

(58) Field of Classification Search ..... 204/193–297.16
See application file for complete search history.

(56) References Cited

U.S. PATENT DOCUMENTS 4,381,979 A * 5/1983 De Nora et al. ............. 205/531
2001/0004049 A1 * 6/2001 Ikeda et al. ................. 204/252

FOREIGN PATENT DOCUMENTS

JP 2004-071456 3/2004

* cited by examiner

Primary Examiner—Alexa D Neckel
Assistant Examiner—Imran Akram
(74) Attorney, Agent, or Firm—Lahive & Cockfield, LLP; Anthony A. Laurentano (57) ABSTRACT

A hydrogen production apparatus comprises a solid polymer electrolyte membrane, a pair of rigid power feeders, separators, pressing means for pressing the separators and the power feeders against the solid polymer electrolyte membrane, a pressure contact surface provided on each of the separators, a recess portion, and fluid channels. Hydrogen gas is obtained by applying a current to each of the power feeders to electrolyze water. A gap G in a range of less than an original thickness of the solid polymer electrolyte membrane is provided between a surface of the power feeder which is provided at least in the cathode side separator and the pressure contact surface. The solid polymer electrolyte membrane intrudes into the gap G, because of elasticity of the solid polymer electrolyte membrane, and directly contacts with the surface of the power feeder provided at least in the cathode side separator.

8 Claims, 4 Drawing Sheets

HYDROGEN PRODUCTION APPARATUS WITH ELECTROLYTE OF VARYING THICKNESSES

BACKGROUND OF THE INVENTION

1. Field of the Invention

The present invention relates to a hydrogen production apparatus, in which hydrogen is produced by the electrolysis of water.

2. Description of the Related Art

Figure 1:
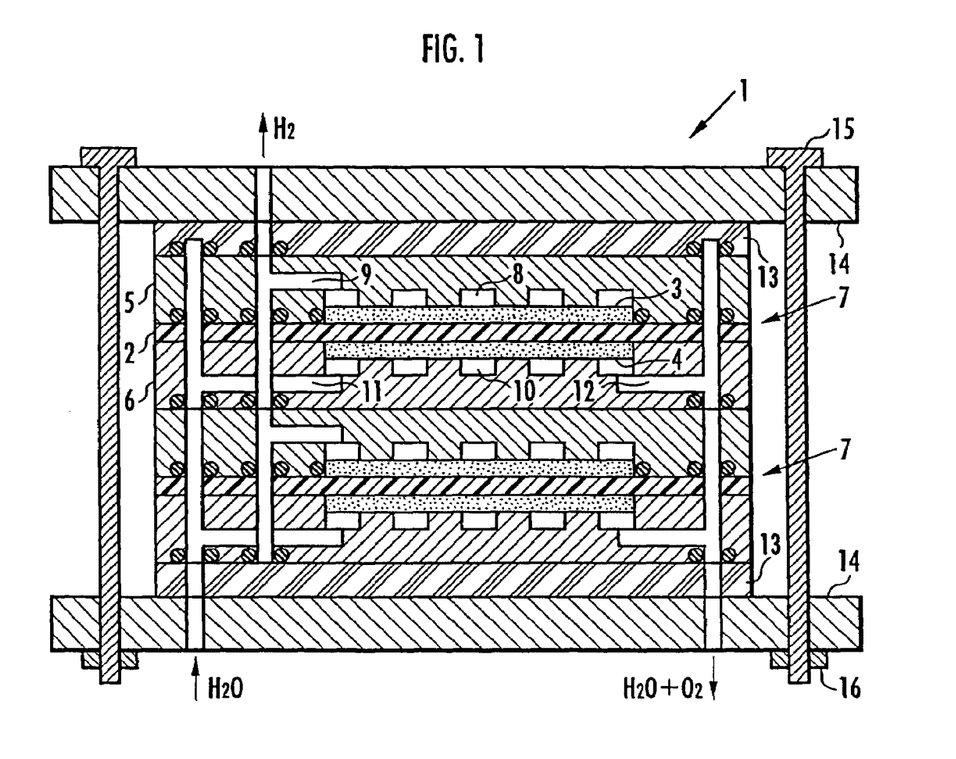
FIG. 1 is an explanatory sectional view showing a structure of a hydrogen production apparatus.

As shown in FIG. 1, there has conventionally been known a hydrogen production apparatus 1 comprising a plurality of single cells 7, 7 being stacked on each other, in which each of the single cells 7, 7 comprises a solid polymer electrolyte membrane 2, power feeders 3, 4 provided opposed to each other on a cathode side and an anode side of the electrolyte 2 respectively, and separators 5, 6 stacked on the respective power feeders 3, 4. Each side of the solid polymer electrolyte membrane 2 comprises a catalyst electrode which is not shown in FIG. 1.

The above described single cells 7, 7 are sandwiched between end plates 14, 14, and are securely fixed to the end plates 14, 14 by screwing a bolt 15 which has been inserted through the end plates 14, 14 into a nut 16. As a result, each of the power feeders 3, 4 and each of the separators 5, 6 are pressed against the solid polymer electrolyte membrane 2.

Figure 2:
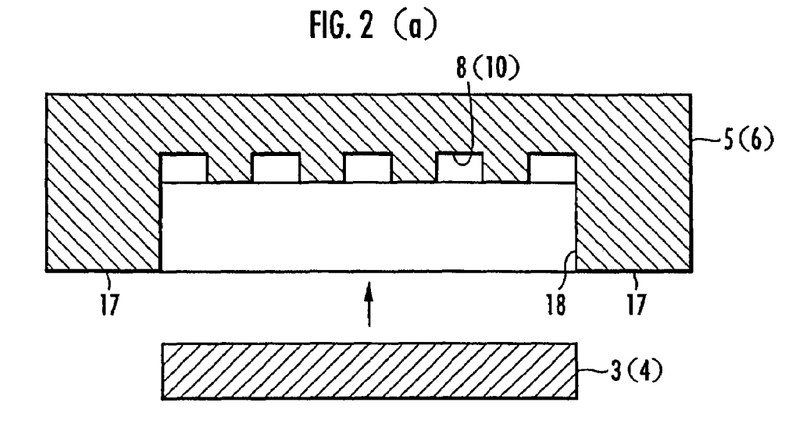
FIG. 2 is an enlarged view of a substantial part from FIG. 1 with regard to the hydrogen production apparatus of an embodiment of the present invention.

In the hydrogen production apparatus 1, as shown in FIG. 2(a), each of the above described separators 5, 6 comprises in a peripheral portion thereof a pressure contact surface 17 to be pressed against the solid polymer electrolyte membrane 2, together with a recess portion 18, which is positioned inwardly of and surrounded by the pressure contact surface 17, wherein the power feeders 3, 4 are disposed within the recessed portion 18. The separators 5, 6 also comprise fluid channels 8, 10 respectively, to which the power feeders 3, 4 are exposed. The power feeders 3, 4 are porous bodies, and a current is applied through the separators 5, 6 by the use of current-carrying means which is not shown in this figure.

In the hydrogen production apparatus 1 which is in a state that each of the power feeders 3, 4 and each of the separators 5, 6 are pressed against the solid polymer electrolyte membrane 2, once water is supplied to the fluid channel 10 of the anode side separator 6 while applying a current to the power feeders 3, 4, water which has been supplied to the fluid channel 10 is electrolyzed at the catalyst electrode layer provided on the anode side, and then hydrogen ions, electrons, and oxygen gas are generated. The hydrogen ions being accompanied by water molecules pass through the solid polymer electrolyte membrane 2 and move toward the cathode side, and then receive electrons from a catalyst electrode layer provided on the cathode side to generate hydrogen gas. The hydrogen gas passes through the porous power feeder 3, and then moves into the fluid channel 8 of the separator 5. Consequently, the hydrogen production apparatus 1 can obtain hydrogen within the fluid channel 8 on the cathode side.

As the above described power feeders 3, 4 used for the hydrogen production apparatus 1, it has been known a feeder having rigidity such as a porous body obtained by sintering spherical titanium particles (see Japanese Patent Laid-Open No. 2004-71456, for example).

Figure 4:
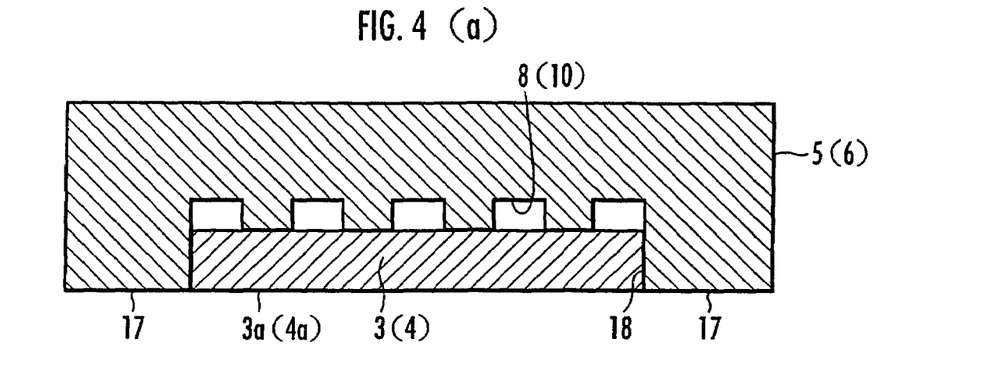
FIG. 4 is an enlarged view of a substantial part from FIG. 1 as a conventional hydrogen production apparatus.

When the above described rigid feeder is used as the power feeders 3, 4, a thickness of each of the power feeders 3, 4 is adapted to correspond to a depth of the recess portion 18 of each of the separators 5, 6 as shown in FIG. 4(a) so that surfaces 3a, 4a of the power feeders 3, 4 become flush with the pressure contact surfaces 17 of the separators 5, 6 respectively. This is because that, if a thickness of each of the power feeders 3, 4 is greater than a thickness of the recess portion 18 of each of the separators 5, 6, the power feeder 3 protrudes from the recess portion 18 and the surface 3a of the power feeder 3 extends to an outside of the pressure contact surface 17 of the separator 5 as shown in FIG. 4(b) for example, and consequently, hydrogen gas which has been generated on the cathode side leaks from a gap S between a surface of the solid polymer electrolyte membrane 2 and the pressure contact surface 17 of the separator 5.

However, the provision of the power feeders 3, 4 whose surfaces 3a, 4a are flush with the pressure contact surfaces 17 of the separators 5, 6 has a disadvantage that both the power feeders 3, 4 and the separators 5, 6 are required to be processed with a high degree of precision and thus are hard to be manufactured. Although it is conceivable that the surfaces 3a, 4a of the power feeders 3, 4 can be flush with the pressure contact surfaces 17 of the separators 5, 6 by grinding the protruding portions if the power feeders 3, 4 protrude from the recess portions 18, an electrolytic efficiency in this case is decreased since porous portions of the porous power feeders 3, 4 are occluded, and hydrogen ions and hydrogen gas and the like are prevented from moving.

In addition, the provision of the power feeders 3, 4 whose surfaces 3a, 4a are flush with the pressure contact surfaces 17 of the separators 5, 6 has a disadvantage that the moisture retention is decreased, because the solid polymer electrolyte membrane 2 is uniformly compressed when each of the power feeders 3, 4 and the pressure contact surface 17 of each of the separators 5, 6 are pressed against the solid polymer electrolyte membrane 2. Since hydrogen ions which have been generated on the anode side of the solid polymer electrolyte membrane 2 pass into the cathode side together with water molecules as described above, the passage of the hydrogen ions is inhibited when the moisture retention of the solid polymer electrolyte membrane 2 is decreased and consequently the electrolytic efficiency is decreased.

SUMMARY OF THE INVENTION

An object of the present invention is to provide a hydrogen production apparatus which is easy to be manufactured and can obtain an excellent electrolytic efficiency, by solving the above described disadvantages.

In order to achieve the above described object, the present invention relates to a hydrogen production apparatus comprising: a solid polymer electrolyte membrane having elasticity; a pair of rigid power feeders, the power feeders provided opposed to each other on a cathode side and an anode side of the solid polymer electrolyte membrane respectively; a separator stacked on each of the power feeders; pressing means for pressing each of the separators and each of the power feeders against the solid polymer electrolyte membrane; a pressure contact surface which is provided in a peripheral portion of each of the separators and is pressed against the solid polymer electrolyte membrane; a recess portion which is positioned inwardly of and surrounded by the pressure contact surface of each of the separators and within which the power feeder is provided; and a fluid channel which is provided on each of the separators and to which each of the power feeders is exposed, the apparatus providing hydrogen gas within the fluid channel of the cathode side separator by supplying water to the fluid channel of the anode side separator while applying a current to each of the power feeders, and then by electrolyzing water which has been supplied to the fluid channel of the anode side separator, wherein at least a surface of the power feeder provided within the recess portion of the cathode side separator is located inside the recess portion, and a gap is provided between the surface of the power feeder and the pressure contact surface of the separator so as to be in a range of less than 100% of a thickness of the solid polymer electrolyte membrane, the above described thickness being obtained before each of the power feeders and each of the separators are pressed against the solid polymer electrolyte membrane.

In the hydrogen production apparatus according to the present invention, the above described separator comprises, in a peripheral portion thereof, a pressure contact surface to be pressed against the solid polymer electrolyte membrane, and the above described power feeder is provided within the recess portion which is positioned inwardly of and surrounded by the pressure contact surface. In addition, at least on the cathode side separator, a surface of the power feeder is allowed to be located within the recess portion, and a gap which is in the above described range is provided between the surface and the pressure contact surface of the separator.

According to the above described arrangement, a peripheral portion of the solid polymer electrolyte membrane is compressed by the pressure contact surface of each separator when each of the power feeders and each of the separators are pressed against the solid polymer electrolyte membrane by the above described pressing means, and consequently the solid polymer electrolyte membrane is sandwiched. On the other hand, at least on the cathode side separator, a surface of the above described power feeder is positioned within the recess portion, and a gap within the above described range is provided between the surface and the pressure contact surface of the separator, and consequently a portion of the solid polymer electrolyte membrane opposed to the power feeder intrudes into the gap between the surface of the power feeder and the pressure contact surface of the separator because of elasticity of the solid polymer electrolyte membrane when each power feeder and each separator are pressed against the solid polymer electrolyte membrane.

Consequently, a portion of the above described solid polymer electrolyte membrane corresponding to the power feeder within the recess portion is compressed to a lesser extent compared to a portion sandwiched by the pressure contact surfaces. Therefore, a portion of the solid polymer electrolyte membrane corresponding to the power feeder within the recess portion can retain moisture, and hydrogen ions generated on the anode side can easily move toward the cathode side passing through the solid polymer electrolyte membrane.

Further, since a gap between a surface of the power feeder and a pressure contact surface of the separator is defined to be in a range less than 100% of an original thickness of the solid polymer electrolyte membrane, a portion of the solid polymer electrolyte membrane corresponding to the power feeder can abut against the power feeder by elasticity of the electrolyte.

As described above, according to the hydrogen production apparatus of the present invention, a portion of the above described solid polymer electrolyte membrane corresponding to the power feeder within the recess portion is compressed to a lesser extent, and also can abut against the power feeder by elasticity of the solid polymer electrolyte membrane even if the gap between a surface of the power feeder and a pressure contact surface of the separator is in a range as described above, and thus an excellent electrolytic efficiency can be obtained.

In addition, the hydrogen production apparatus can easily be manufactured because, at least on the cathode side separator, a thickness of the power feeder may be reduced compared with a depth of the recess portion such that a gap between a surface of the power feeder and a pressure contact surface of the separator is within a range as described above, and thus a process with a high degree of precision such as making a surface of the power feeder flush with a pressure contact surface of the separator is not required.

Further, since a surface of the power feeder is allowed to be located inside the recess portion at least on the cathode side separator, an outer periphery of the cathode side power feeder is surrounded by a pressure contact surface of the cathode side separator so as to be absolutely sealed therein when each of the power feeders and each of the separators are pressed against the solid polymer electrolyte membrane. Consequently, leakage of the hydrogen gas which has been generated can absolutely be prevented in an area in which the cathode side power feeder comes into contact with the solid polymer electrolyte membrane.

In the hydrogen production apparatus according to the present invention, a gap between a surface of the above described power feeder and a pressure contact surface of the above described separator is required to be in a range less than 100% of an original thickness of the solid polymer electrolyte membrane. If the gap exceeds 100% of the original thickness of the solid polymer electrolyte membrane, the electrolysis of water per se becomes impossible to be carried out, because a portion of the solid polymer electrolyte membrane corresponding to the power feeder cannot abut against the power feeder and thus the current cannot be applied from the power feeder.

In the hydrogen production apparatus according to the present invention, it is preferable that a surface of the power feeder provided within the above described recess portion is allowed to be located inside the recess portion at least on the cathode side separator, and that a gap in the above described range is provided between a surface of the power feeder and a pressure contact surface of the separator. In this case, it is also preferable that a surface of the power feeder provided within the above described recess portion is allowed to be located inside the recess portion even on the anode side separator, and that a gap in the above described range is provided between a surface of the power feeder and a pressure contact surface of the separator. In this way, both of the separators and the power feeders on the cathode side and the anode side can easily be manufactured.

Further, in the hydrogen production apparatus according to the present invention, although the gap between a surface of the above described power feeder and a pressure contact surface of the above described separator is required to be in a range less than 100% of an original thickness of the solid polymer electrolyte membrane because of the above described reasons, it is preferable that the gap is in a range between 15% or more and less than 100% of the original thickness of the solid polymer electrolyte membrane, and thus an excellent electrolytic efficiency can absolutely be obtained.

If the gap between a surface of the power feeder and a pressure contact surface of the separator is less than 15% of an original thickness of the solid polymer electrolyte membrane, a sufficient electrolytic efficiency may not be obtained because a degree of compression developed in a portion of the solid polymer electrolyte membrane corresponding to the power feeder becomes larger and thus moisture cannot be retained sufficiently, when each of the power feeders and each of the separators are pressed against the solid polymer electrolyte membrane.

DETAILED DESCRIPTION OF THE PREFERRED EMBODIMENTS

Embodiments of the present invention will now be further described in detail with reference to accompanying drawings.

As shown in FIG. 1, a hydrogen production apparatus 1 of the present embodiment has a structure comprising two single cells 7 being stacked on each other, and each of the single cells 7 comprises: a solid polymer electrolyte membrane 2; a cathode side power feeder 3 and an anode side power feeder 4 being opposed to each other on a cathode side and an anode side of the solid polymer electrolyte membrane 2 respectively; and a cathode side separator 5 and an anode side separator 6 stacked on the power feeders 3, 4 respectively. As for the single cells 7, 7, the anode side separator 6 of one single cell 7 is stacked on the cathode side separator 5 of the other single cell 7.

In each single cell 7, the cathode side separator 5 comprises a fluid channel 8 to which the cathode side power feeder 3 is exposed and a hydrogen drawing port 9 which is in communication with the fluid channel 8, and the anode side separator 6 comprises a fluid channel 10 to which the anode side power feeder 4 is exposed, a water supplying port 11 which is in communication with one end of the fluid channel 10, and a drainage port 12 which is in communication with the other end of the fluid channel 10.

Each of the power feeders 3, 4 are adapted to be energized via each of the separators 5, 6 by the use of current-carrying means which is not shown in FIG. 1. This structure is advantageous because each of the single cells 7, 7 are connected in series such that a cathode side separator 5 of one single cell 7 is stacked on an anode side separator 6 of the other single cell 7 as described above.

The single cells 7, 7 are sandwiched from both sides between end plates 14, 14 via insulating members 13, 13, and are screwed by a bolt 15 and a nut 16 attached to the end plates 14, 14 so as to be tightly fixed to each other. Consequently, each of the power feeders 3, 4 and each of the separators 5, 6 are pressed against the solid polymer electrolyte membrane 2.

In this case, all of the hydrogen drawing port 9, water supplying port 11, and the drainage port 12 are in communication with each other within each of the single cells 7, 7, and are also provided so as to be inserted through the insulating member 13 and the end plate 14.

In the hydrogen production apparatus 1, the solid polymer electrolyte membrane 2 is a cation-permeable membrane, and thus it is possible to use Nafion (Registered Trademark, made by DuPont Co.), Aciplex (Brand Name, made by Asahi Kasei Corp.) and the like. The solid polymer electrolyte membrane 2 comprises an electrode catalyst layer containing a $RuIrFeO_x$ catalyst (not shown) for example on the anode side, and also comprises an electrode catalyst layer containing a platinum catalyst (not shown) for example in the cathode side.

The cathode side power feeder 3 and the anode side power feeder 4 can be made of a titanium porous sintered body for example, a surface of which is plated with platinum. The above described titanium porous sintered body can be obtained by filling a sintering vessel having a predetermined shape with spherical gas atomized titanium powder and then sintering the powder in vacuo for example, the spherical gas atomized titanium powder being manufactured by a gas atomization method in which molten titanium droplets are solidified during scattering in the air. The titanium porous sintered body may also be obtained by filling a sintering vessel having a predetermined shape with titanium fibers and then sintering the fibers in vacuo for example, the titanium fibers being manufactured by a coiled sheet shaving method in which a titanium sheet coil is shaved to a fiber form.

In addition, each of the cathode side separator 5 and the anode side separator 6 is made of a titanium plate for example, and comprises in a peripheral portion thereof a pressure contact surface 17 to be pressed against the solid polymer electrolyte membrane 2 and also comprises a recess portion 18 positioned inwardly of and surrounded by the pressure contact surface 17 in which the cathode side power feeder 3 and the anode side power feeder 4 are provided as shown in FIG. 2(a). Each of the fluid channels 8, 10 is formed at a bottom of the recess portion 18 such that the cathode side power feeder 3 is exposed to the fluid channel 8 and the anode side power feeder 4 is exposed to the fluid channel 10 when the cathode side power feeder 3 and the anode side power feeder 4 are provided within the recess portion 18.

As for the cathode side separator 5 of the hydrogen production apparatus 1, a surface 3a of the cathode side power feeder 3 is allowed to be located inside the recess portion 18 when the cathode side power feeder 3 is provided in the recess portion 18, and a gap G is provided between the surface 3a and the pressure contact surface 17 of the cathode side separator 5, as shown in FIG. 2(b). The gap G is set to be in a range between 15% or more and less than 100% of a thickness of the solid polymer electrolyte membrane 2, the thickness being obtained before the cathode side power feeder 3, the anode side power feeder 4, the cathode side separator 5, and the anode side separator 6 are pressed against the solid polymer electrolyte membrane 2 (hereinafter, abbreviated to "an original thickness of a solid polymer electrolyte membrane 2").

When the surface 3a of the cathode side power feeder 3 is allowed to be located within the recess portion 18 as described above, a thickness of the cathode side power feeder 3 is preferably reduced compared to a depth of the recess portion 18, and thus the cathode side separator 5 and the cathode side power feeder 3 can easily be manufactured.

As for the anode side separator 6, a surface 4a of the anode side power feeder 4 is flush with the pressure contact surface 17 when the anode side power feeder 4 is provided in the recess portion 18. This structure corresponds to a case in which a gap G is zero in FIG. 2(b).

The cathode side separator 5 in which the cathode side power feeder 3 is provided and the anode side separator 6 in which the anode side power feeder 4 is provided are respectively stacked on a cathode side and an anode side of the solid polymer electrolyte membrane 2 as shown in FIG. 2(c) to makeup a single cell 7.

In FIG. 2(a) to (c), the hydrogen drawing port 9, the water supplying port 11, and the drainage port 12 are omitted.

In the hydrogen production apparatus 1, it is essential only that at least the surface 3a of the cathode side power feeder 3 provided within the recess portion 18 of the cathode side separator 5 is allowed to be located inside the recess portion 18 such that a gap G is provided between the surface 3a and the pressure contact surface 17 of the cathode side separator 5. However, as for the anode side power feeder 4 provided in the recess portion 18 of the anode side separator 6, it is also preferable that a surface 4a is allowed to be located inside the recess portion 18 such that a gap G is provided between the surface 4a and the pressure contact surface 17 of the anode side separator 6. In this way, the anode side separator 6 and the anode side power feeder 4 can easily be manufactured.

Further, although a hydrogen production apparatus 1 of the present embodiment which has two single cells 7 stacked on each other is illustrated herein, a hydrogen production apparatus 1 which has one single cell 7 or alternatively three or more single cells 7 may also be used.

Next, operation of the hydrogen production apparatus 1 will be described.

In the hydrogen production apparatus 1 comprising the above described structure, single cells 7, 7 are firstly stacked on each other, and sandwiched from both sides of the stacked single cells 7, 7 between end plates 14, 14 via insulating members 13, 13, and then screwed up by a bolt 15 and a nut 16 so as to be tightly fixed to each other in order to fabricate the apparatus. Consequently, each of the power feeders 3, 4 and each of the separators 5, 6 are pressed against the solid polymer electrolyte membrane 2.

In this case, a surface 3a of the cathode side power feeder 3 provided in the recess portion 18 of the cathode side separator 5 is allowed to be located inside the recess portion 18 as shown in FIG. 2(b). And a gap G within a range between 15% or more and less than 100% of an original thickness of the solid polymer electrolyte membrane 2 is provided between the surface 3a and the pressure contact surface 17 of the cathode side separator 5. As for the anode side power feeder 4 provided in the recess portion 18 of the anode side separator 6, a gap G in FIG. 2(b) is set to be zero, and thus the surface 4a is flush with the pressure contact surface 17 of the anode side separator 6.

When each of the power feeders 3, 4 and each of the separators 5, 6 are pressed against the solid polymer electrolyte membrane 2, a peripheral portion of the solid polymer electrolyte membrane 2 is compressed and sandwiched by the pressure contact surfaces 17 of the cathode side separator 5 and of the anode side separator 6, as shown in FIG. 2(c) as a single cell 7. On the other hand, as for the cathode side separator 5, a portion of the solid polymer electrolyte membrane 2 corresponding to the cathode side power feeder 3 within the recess portion 18 intrudes into the gap G between the surface 3a of the cathode side power feeder 3 and the pressure contact surface 17 of the cathode side separator 5.

Therefore, the portion of the solid polymer electrolyte membrane 2 corresponding to the cathode side power feeder 3 within the recess portion 18 is compressed to a lesser extent compared with a portion sandwiched between the pressure contact surfaces 17, and thus the lesser compressed portion can retain moisture. In addition, the portion of the solid polymer electrolyte membrane 2 corresponding to the cathode side power feeder 3 within the recess portion 18 can abut against the cathode side power feeder 3 because of the elasticity of this portion.

The hydrogen production apparatus 1, which is in a state described above, supplies water from the water supplying port 11 to the fluid channel 10 of the anode side separator 6. And then the water is electrolyzed by passing the current through the cathode side power feeder 3 and the anode side power feeder 4 via the cathode side separator 5 and the anode side separator 6 respectively, by the use of current-carrying means which is not shown. According to the above described electrolysis, water supplied from the fluid channel 10 is electrolyzed on the anode side of the solid polymer electrolyte membrane 2 to generate hydrogen ions, electrons, and oxygen gas. The above described hydrogen ions pass through the solid polymer electrolyte membrane 2 which is made of a cation-permeable membrane and then move toward the cathode side power feeder 3, because of an electric potential difference between the cathode side power feeder 3 and the anode side power feeder 4. And then the hydrogen ions receive electrons from the cathode side power feeder 3 on the cathode side of the solid polymer electrolyte membrane 2 so as to be made into a molecule, and consequently, hydrogen gas can be obtained in the fluid channel 8 of the cathode side separator 5. The hydrogen gas, together with water, is withdrawn from the fluid channel 8 through the hydrogen drawing port 9. On the other hand, water which contains oxygen gas generated on the anode side of the solid polymer electrolyte membrane 2 is withdrawn from the drainage port 12.

In this case, the solid polymer electrolyte membrane 2 can be electrically energized by the cathode side power feeder 3 since a portion of the solid polymer electrolyte membrane 2 corresponding to the cathode side power feeder 3 within the recess portion 18 abuts against the cathode side power feeder 3, and thus moisture can be retained in the portion corresponding to the cathode side power feeder 3 within the recess portion 18. Therefore, the hydrogen ions generated on the anode side can easily move toward the cathode side together with water molecules.

Further, in the hydrogen production apparatus 1, outer peripheries of the power feeders 3, 4 are surrounded by the pressure contact surfaces 17, 17, and the pressure contact surfaces 17, 17 are pressed against the solid polymer electrolyte membrane 2. Therefore, a portion of the solid polymer electrolyte membrane 2 corresponding to the cathode side power feeder 3 within the recess portion 18 is sealed with the pressure contact surfaces 17, 17. Consequently, hydrogen gas generated at a portion of the solid polymer electrolyte membrane 2 corresponding to the cathode side power feeder 3 within the recess portion 18 can absolutely be prevented from leaking into the outside.

Examples and Comparative Examples of the present invention will now be described.

EXAMPLE 1

In this example, a membrane-electrode assembly (MEA) was firstly manufactured by forming a catalyst electrode layer containing $RuIrFeO_x$ as a catalyst on an anode side of a solid polymer electrode 2 having a thickness of 0.13 mm, as well as forming a catalyst electrode layer containing Pt as a catalyst on a cathode side of the solid polymer electrode 2.

Then a cathode side separator 5 and an anode side separator 6, each of which comprises a pressure contact surface 17, a recess portion 18, and a fluid channel 8, were manufactured by using a titanium plate.

Next, a cathode side power feeder 3 having a diameter of 30 mm and a thickness of 0.5 mm was manufactured by using a titanium fiber sintered body whose surface was plated with platinum, and was provided within a recess portion 18 of the cathode side separator 5 as shown in FIG. 2(b). At this point, a depth of the recess portion 18 was adjusted such that a gap G between a surface 3a of the cathode side power feeder 3 and a pressure contact surface 17 of the cathode side separator 5 became 0.02 mm. The gap G in this example corresponds to 15% of an original thickness of the solid polymer electrolyte membrane 2 (0.13 mm).

Subsequently, an anode side power feeder 4 having a diameter of 30 mm and a thickness of 0.5 mm was manufactured by using a titanium powder sintered body whose surface was plated with platinum, and was provided within a recess portion 18 of the anode side separator 6 as shown in FIG. 2(b). At this point, a depth of the recess portion 18 was adjusted such that a gap G in FIG. 2(b) became zero and that a surface 4a of the anode side power feeder 4 became flush with a pressure contact surface 17 of the anode side separator 6.

Next, the cathode side separator 5 provided with the cathode side power feeder 3 was stacked on a cathode side of the above described membrane-electrode assembly. In addition, the anode side separator 6 provided with the anode side power feeder 4 was also stacked on an anode side of the above described membrane-electrode assembly to construct a single cell 7 as shown in FIG. 2(c). Thus constructed single cells 7 were stacked in three layers, and this stacked structure was sandwiched from both sides thereof between end plated 14, 14 via insulating members 13, 13, and then was screwed up by bolts 15 and nuts 16 attached to the end plates 14, 14. In this way, the same hydrogen production apparatus 1 as shown in FIG. 1 was fabricated, except that the single cells 7 were stacked in three layers. A pressure during screwing up the cells was 40 MPa.

Consequently, all of the above described screwing up pressure of 40 MPa is exerted on a portion of the solid polymer electrolyte membrane 2 which has been sandwiched between the pressure contact surfaces 17, 17, so that a thickness $d_1$ of this portion becomes 25 μm. On the other hand, a portion of the solid polymer electrolyte membrane 2 corresponding to the cathode side electrode 3 within the recess portion 18 intrudes into the gap G between the surface 3a of the cathode side power feeder 3 and the pressure contact surface 17 of the cathode side separator 5, and abuts against the cathode side power feeder 3 because of the elasticity of the solid polymer electrolyte membrane 2. A pressure of 10 MPa is exerted on a portion of the solid polymer electrolyte membrane 2 corresponding to the cathode side electrode 3 within the recess portion 18, so that a thickness $d_2$ of the solid polymer electrolyte membrane 2 becomes 65 μm.

Consequently, a portion of the solid polymer electrolyte membrane 2 having a thickness $d_2$=65 μm retains moisture and thus hydrogen ions can easily pass through this portion, while a portion having a thickness $d_1$=25 μm which has been strictly compressed is poor in moisture and thus hydrogen ions and hydrogen gas cannot easily pass through this portion. Therefore, the solid polymer electrolyte membrane 2 can prevent the hydrogen gas from leaking out of the portion having a thickness $d_1$=25 μm.

Figure 3:
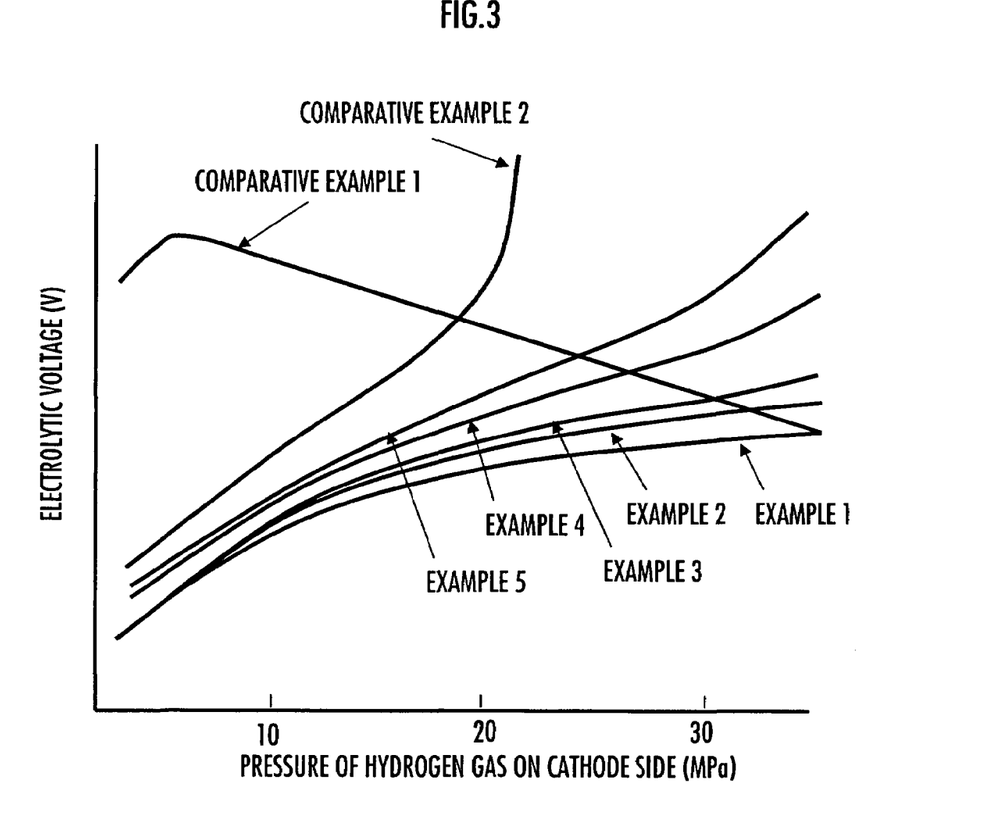
FIG. 3 is a graph showing a relation between a pressure of hydrogen gas generated and an electrolytic voltage in the hydrogen production apparatus shown in FIG. 1.

Next, water having a temperature of 80° C. was supplied from the water supplying port 11 into the hydrogen production apparatus 1 of this example, in order to produce hydrogen by the electrolysis of water. A relation at this point between a pressure of the hydrogen gas obtained on the cathode side and an electrolytic voltage is shown in FIG. 3.

EXAMPLE 2

In this example, a hydrogen production apparatus 1 similar to that shown in FIG. 1 was fabricated in an identical manner to Example 1, except that a gap G between the surface 3a of the cathode side power feeder 3 and the pressure contact surface 17 of the cathode side separator 5 was adjusted to be 0.04 mm. The gap G in this example corresponds to 31% of an original thickness of the solid polymer electrolyte membrane 2.

Water having a temperature of 80° C. was then supplied from the water supplying port 11 into the hydrogen production apparatus 1 of this example, in order to produce hydrogen by the electrolysis of water. A relation at this point between a pressure of the hydrogen gas obtained on the cathode side and an electrolytic voltage is shown in FIG. 3.

EXAMPLE 3

In this example, a hydrogen production apparatus 1 similar to that shown in FIG. 1 was fabricated in an identical manner to Example 1, except that a gap G between the surface 3a of the cathode side power feeder 3 and the pressure contact surface 17 of the cathode side separator 5 was adjusted to be 0.06 mm. The gap G in this example corresponds to 46% of an original thickness of the solid polymer electrolyte membrane 2.

Water having a temperature of 80° C. was then supplied from the water supplying port 11 into the hydrogen production apparatus 1 of this example, in order to produce hydrogen by the electrolysis of water. A relation at this point between a pressure of the hydrogen gas obtained on the cathode side and an electrolytic voltage is shown in FIG. 3.

EXAMPLE 4

In this example, a hydrogen production apparatus 1 similar to that shown in FIG. 1 was fabricated in an identical manner to Example 1, except that a gap G between the surface 3a of the cathode side power feeder 3 and the pressure contact surface 17 of the cathode side separator 5 was adjusted to be 0.08 mm. The gapG in this example corresponds to 62% of an original thickness of the solid polymer electrolyte membrane 2.

Water having a temperature of 80° C. was then supplied from the water supplying port 11 into the hydrogen production apparatus 1 of this example, in order to produce hydrogen by the electrolysis of water. A relation at this point between a pressure of the hydrogen gas obtained on the cathode side and an electrolytic voltage is shown in FIG. 3.

EXAMPLE 5

In this example, a hydrogen production apparatus 1 similar to that shown in FIG. 1 was fabricated in an identical manner to Example 1, except that a gap G between the surface 3a of the cathode side power feeder 3 and the pressure contact surface 17 of the cathode side separator 5 was adjusted to be 0.10 mm. The gap G in this example corresponds to 77% of an original thickness of the solid polymer electrolyte membrane 2.

Water having a temperature of 80° C. was then supplied from the water supplying port 11 into the hydrogen production apparatus 1 of this example, in order to produce hydrogen by the electrolysis of water. A relation at this point between a pressure of the hydrogen gas obtained on the cathode side and an electrolytic voltage is shown in FIG. 3.

COMPARATIVE EXAMPLE 1

In this comparative example, a hydrogen production apparatus 1 similar to that shown in FIG. 1 was fabricated in an identical manner to Example 1, except that the surface 3a of the cathode side power feeder 3 was adjusted to be flush with the pressure contact surface 17 of the cathode side separator 5 and that a gap G was adjusted to be zero. The gap G in this comparative example corresponds to 0% of an original thickness of the solid polymer electrolyte membrane 2.

Water having a temperature of 80° C. was then supplied from the water supplying port 11 into the hydrogen production apparatus 1 of this comparative example, in order to produce hydrogen by the electrolysis of water. A relation at this point between a pressure of the hydrogen gas obtained on the cathode side and an electrolytic voltage is shown in FIG. 3.

COMPARATIVE EXAMPLE 2

In this comparative example, a hydrogen production apparatus 1 similar to that shown in FIG. 1 was fabricated in an identical manner to Example 1, except that a gap G between the surface 3a of the cathode side power feeder 3 and the pressure contact surface 17 of the cathode side separator 5 was adjusted to be 0.15 mm. The gap G in this comparative example corresponds to 115% of an original thickness of the solid polymer electrolyte membrane 2.

Water having a temperature of 80° C. was then supplied from the water supplying port 11 into the hydrogen production apparatus 1 of this comparative example, in order to produce hydrogen by the electrolysis of water. A relation at this point between a pressure of the hydrogen gas obtained on the cathode side and an electrolytic voltage is shown in FIG. 3.

According to the hydrogen production apparatuses of Examples 1 to 5 in which the respective gaps G are within a range from 15 to 77% of the original thickness of the solid polymer electrolyte membrane 2 as shown in FIG. 3, it is apparent that the electrolytic voltage when a pressure of the hydrogen gas on the cathode side is 35 MPa or less is sufficiently reduced and is excellent in its electrolytic efficiency.

On the contrary, in the hydrogen production apparatus 1 of Comparative Example 1 in which the gap G is zero, it is apparent that an initial electrolytic voltage becomes higher than that of the above described Examples 1 to 3. The reason why the initial electrolytic voltage becomes higher than that of the above described Examples 1 to 5 in the hydrogen production apparatus 1 of Comparative Example 1 is assumed that the solid polymer electrolyte membrane 2 is uniformly compressed by the power feeders 3, 4 and the separators 5, 6 and thus cannot sufficiently retain moisture.

Further, in the hydrogen production apparatus 1 of Comparative Example 2 in which the gap G exceeds 100% of the original thickness of the solid polymer electrolyte membrane 2, it is apparent that an electrolytic voltage exhibits a significant increase and thus the electrolysis per se is not allowed to occur. The reason why the electrolytic voltage exhibits a significant increase in the hydrogen production apparatus 1 of Comparative Example 2 is assumed that the solid polymer electrolyte membrane 2 does not sufficiently abut against the power feeder 3 within the recess portion 18 of the cathode side separator 5, due to the gap G which exceeds 100% of the original thickness of the solid polymer electrolyte membrane 2.

What is claimed is:

1. A hydrogen production apparatus, comprising: a solid polymer electrolyte membrane having elasticity;
   a pair of rigid power feeders, the power feeders provided opposed to each other on a cathode side and an anode side of the solid polymer electrolyte membrane respectively;
   a separator stacked on each of the power feeders;
   pressing means for pressing each of the separators and each of the power feeders against the solid polymer electrolyte membrane;
   a pressure contact surface which is provided in a peripheral portion of each of the separators and is pressed against the solid polymer electrolyte membrane;
   a recess portion which is positioned inwardly of and surrounded by the pressure contact surface of each of the separators, and within which the power feeder is provided; and
   a fluid channel which is provided on each of the separators, and to which each of the power feeders is exposed,
   the apparatus providing hydrogen gas within the fluid channel of the cathode side separator by supplying water to the fluid channel of the anode side separator as well as applying a current to each of the power feeders, and then by electrolyzing water which has been supplied to the fluid channel of the anode side separator,
   wherein at least a surface of the power feeder provided within the recess portion of the cathode side separator is located inside the recess portion, and a gap is provided between the surface of the power feeder and the pressure contact surface of the separator to be in a range of less than 100% of a thickness of the solid polymer electrolyte membrane, the thickness being obtained before each of the power feeders and each of the separators are pressed against the solid polymer electrolyte membrane,
   wherein the surface of the power feeder provided within the recess portion of the cathode side separator directly contacts the solid polymer electrolyte membrane when the pressing means is applied, and
   wherein the thickness of a portion of the solid polymer electrolyte membrane in direct contact with the separators is less than the thickness of a portion of the solid electrolyte membrane in direct contact with the surface of the power feeder provided within the recess portion of the cathode side separator without being compressed.

2. The hydrogen production apparatus according to claim 1, wherein a portion of the solid polymer electrolyte membrane opposed to the power feeder intrudes into the gap between the surface of the power feeder and the pressure contact surface of the separator, due to elasticity of the solid polymer electrolyte membrane, when each of the power feeders and each of the separators are pressed against the solid polymer electrolyte membrane.

3. The hydrogen production apparatus according to claim 1, wherein a surface of the power feeder provided within the recess portion of the anode side separator is located inside the recess portion, and a gap is provided between the surface of the power feeder and the pressure contact surface of the separator to be in a range of less than 100% of a thickness of the solid polymer electrolyte membrane without pressure of the power feeders and each of the separators.

4. The hydrogen production apparatus according to claim 1, wherein the gap between the surface of the power feeder and the pressure contact surface of the separator is in a range between 15% or more and less than 100% of a thickness of the solid polymer electrolyte membrane without pressure of the power feeders and each of the separators.

5. The hydrogen production apparatus according to claim 1, wherein the gap between the surface of the power feeder and the pressure contact surface of the separator is in a range between 15% or more and 77% or less of a thickness of the solid polymer electrolyte membrane without pressure of the power feeders and each of the separators.

6. The hydrogen production apparatus according to claim 1, wherein the solid polymer electrolyte membrane having elasticity is a cation-permeable membrane.

7. The hydrogen production apparatus according to claim 1, wherein the electric feeder having rigidity is made of a titanium porous sintered body, a surface of which is plated with platinum.

8. The hydrogen production apparatus according to claim 1, wherein each of the separators is made of a titanium plate.

* * * * *